(12) United States Patent
Amann

(10) Patent No.: US 6,866,700 B2
(45) Date of Patent: Mar. 15, 2005

(54) FILTER HOUSING ASSEMBLY FOR USE IN OXYGEN CONCENTRATORS AND OTHER COMPRESSORS

(75) Inventor: Harold P. Amann, Sunset Hills, MO (US)

(73) Assignee: AG Industries, Fenton, MO (US)

(*) Notice: Subject to any disclaimer, the term of this patent is extended or adjusted under 35 U.S.C. 154(b) by 0 days.

(21) Appl. No.: 10/064,898

(22) Filed: Aug. 27, 2002

(65) Prior Publication Data

US 2004/0040274 A1 Mar. 4, 2004

(51) Int. Cl.[7] .......................... B01D 35/34; B01D 46/02
(52) U.S. Cl. .......................... 95/273; 55/385.1; 55/467; 55/498; 55/499; 55/501; 55/502; 55/510; 55/521; 55/DIG. 5; 96/380; 156/60; 156/73.1; 156/73.5
(58) Field of Search ............................... 55/385.1, 467, 55/498, 499, 501, 502, 503, 505, 507, 510, 511, 521, DIG. 5; 95/273; 96/380; 156/60, 73.1, 73.5

(56) References Cited

U.S. PATENT DOCUMENTS

| | | | |
|---|---|---|---|
| 3,289,847 A | | 12/1966 | Rothemund |
| 4,036,616 A | * | 7/1977 | Byrns ........................ 55/498 |
| 4,063,913 A | * | 12/1977 | Kippel et al. ............... 55/498 |
| 4,493,717 A | * | 1/1985 | Berger et al. ............... 55/503 |
| 4,588,426 A | * | 5/1986 | Virgille et al. ............. 55/503 |
| 4,941,900 A | | 7/1990 | Cordes |
| 5,024,764 A | | 6/1991 | Holler |
| 5,060,514 A | | 10/1991 | Aylsworth |
| 5,106,501 A | | 4/1992 | Yang et al. |
| D330,746 S | | 11/1992 | Zazulia |
| 5,250,179 A | | 10/1993 | Spearman |
| 5,275,642 A | | 1/1994 | Bassine |
| 5,290,445 A | * | 3/1994 | Buttery ........................ 55/503 |
| 5,454,945 A | | 10/1995 | Spearman |
| 5,858,062 A | | 1/1999 | McCulloh et al. |
| D410,727 S | | 6/1999 | Khamis et al. |
| 5,916,435 A | | 6/1999 | Spearman et al. |
| 6,325,925 B1 | | 12/2001 | Hansen |
| 6,325,926 B1 | | 12/2001 | Hansen |
| 6,346,139 B1 | | 2/2002 | Czabala |
| 6,394,089 B1 | | 5/2002 | Cantrill et al. |

* cited by examiner

Primary Examiner—Duane Smith
Assistant Examiner—Jason M. Greene
(74) Attorney, Agent, or Firm—Blackwell Sanders Peper Martin LLP

(57) ABSTRACT

A filter housing assembly including a substantially frusto-conical shaped housing member having an open end portion and a substantially closed dome shaped portion, the housing member being adaptable for receiving a filter member therewithin and having at least one opening extending through the dome shaped portion for allowing air to enter therewithin. A first end cap member adaptable for engaging one end portion of a filter member is receivable within the housing member, and a second end cap member adaptable for engaging the opposite end portion of a filter member is engageable with the housing member. The second end cap member includes an opening for allowing air to exit the housing member. The housing member includes a centering mechanism engageable with the first end cap member for facilitating centering of the filter member within the housing member when the first end cap member is positioned within the housing member.

26 Claims, 2 Drawing Sheets

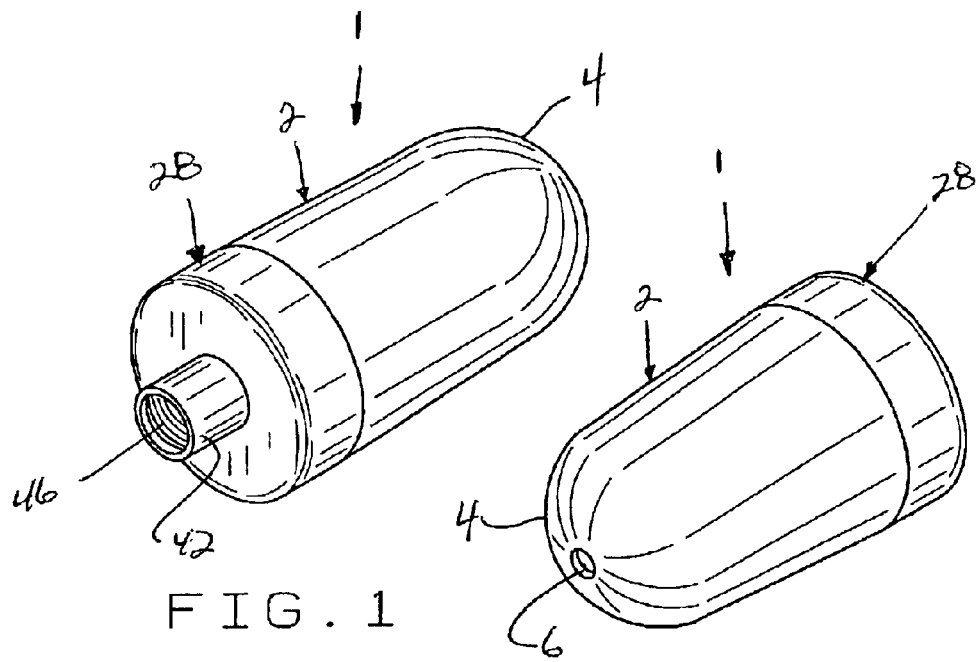
FIG. 1
FIG. 2
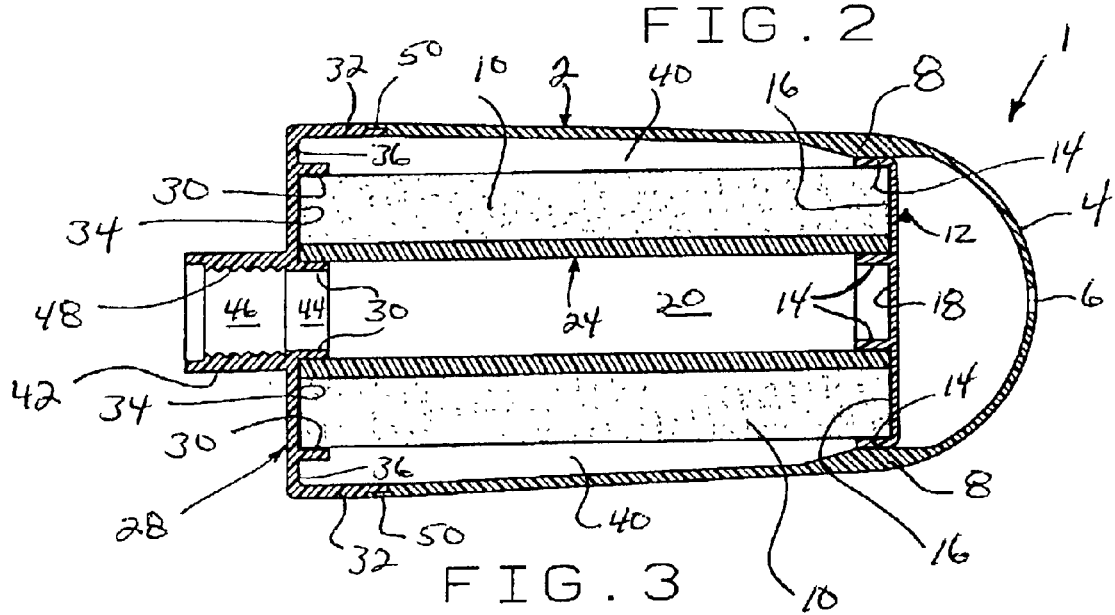
FIG. 3

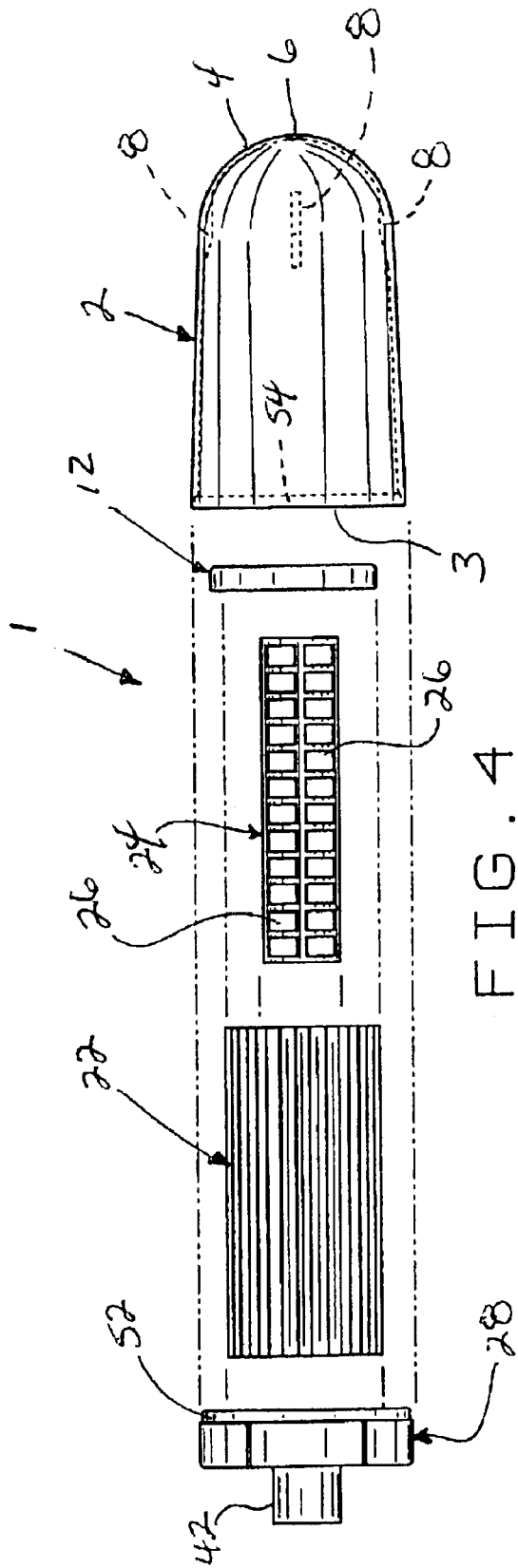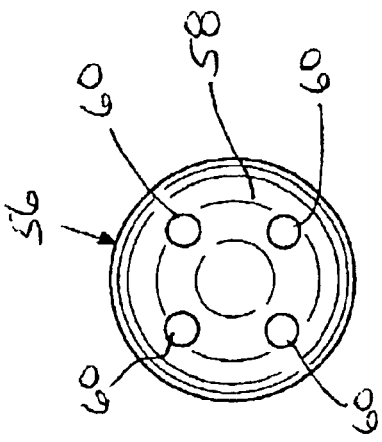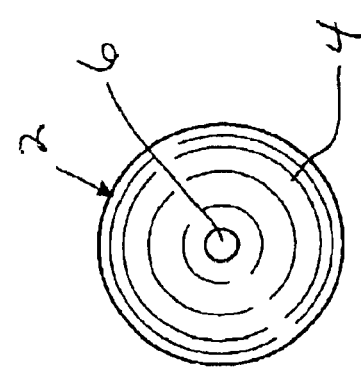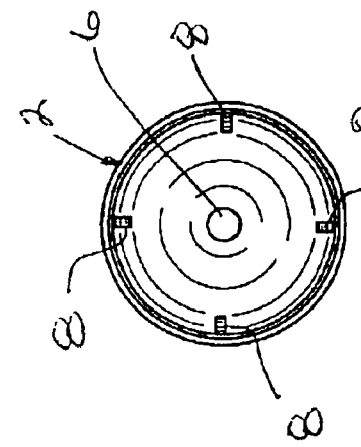

FILTER HOUSING ASSEMBLY FOR USE IN OXYGEN CONCENTRATORS AND OTHER COMPRESSORS

BACKGROUND OF INVENTION

This invention relates generally to filter assemblies and, more particularly, to various embodiments of a filter housing assembly for use in compressors such as oxygen concentrators and other medical applications in the home care medical equipment industry.

Oxygen concentrators are commonly used in the care of respiratory patients, particularly, in the home care environment, to provide sufficiently high purities of oxygen to the patient without using high pressure tanks or liquid oxygen. Oxygen concentrators utilize ambient atmospheric air as their source of oxygen in conjunction with an absorption system to separate oxygen from the other gases found in the air and to provide that oxygen in concentrated form to the patient. Atmospheric air typically includes approximately 80% nitrogen and 20% oxygen. The various types of absorption systems used in oxygen concentrators generally include molecular sieve beds for separating the gas mixture into an oxygen portion and a nitrogen portion. Nitrogen is absorbed by the molecular sieve beds when under pressure and is retained in such sieve beds until subsequently purged. Typically, two sieve beds are utilized so that as one sieve bed separates nitrogen from the oxygen, the other sieve bed is simultaneously purged of the nitrogen absorbed during the prior separation cycle. This separation process is accomplished through an appropriate absorbent material utilized in the sieve beds such as special granulated materials, for example, Zeolite® granules, which selectively absorb the oxygen from the compressed air passing through the sieve beds.

Typically, atmospheric air is drawn into an oxygen concentrator from the ambient environment. Such ambient air is then passed through a filter assembly to remove dust and other contaminants, and the filtered air is then pressurized by a compressor for introduction into the absorption system or molecular sieve beds. Once the compressed air is introduced into one of the molecular sieve beds containing the granulated absorbent material, nitrogen is selectively absorbed leaving the residual oxygen available for patient use. After a predetermined period of time, the supply of compressed air is automatically diverted to the second molecular sieve bed where the process is repeated enabling the output of oxygen to continue uninterrupted. While pressure in the second molecular sieve bed is increased, the pressure in the first molecular sieve bed is reduced to zero thereby allowing nitrogen to be released and returned to the atmosphere. The granulated absorbent material is then regenerated and made ready for the next cycle. By alternating the pressure in the two molecular sieve beds, a constant supply of oxygen is produced while the selected absorbent material is continually being regenerated. Oxygen concentrators typically produce an oxygen concentration usually in the range of 90–95%.

Use of an effective filtration system for purging contaminants from any liquid or gas is always important for a multitude of obvious reasons. Properly and effectively filtering the incoming ambient air before it is compressed and introduced into the molecular sieve beds of an oxygen concentrator is likewise important because effective filtration not only improves the overall efficiency of the oxygen concentrator but it also improves and increases the oxygen concentration provided to the patient. Routine maintenance also includes changing the air filters at regular intervals. As a result, easy access to the filter assembly, easy manipulation, removal and re-installation of the filter housing assembly, and improved filtration of the air passing through the filter assembly are important characteristics of any oxygen concentrator. Still further, the type and size of compressor associated with an oxygen concentrator determines the overall oxygen flow rate capacity as well as the level of noise produced by the system during operation. In general, large compressors required for providing higher rates of oxygen can be quite noisy.

It is therefore desirable to provide a filter housing assembly which improves the air filtration process to the molecular sieve beds, which is easily manipulated to change filter assemblies on a periodic basis, and which can reduce and dampen the overall noise level associated with the operation of an oxygen concentrator or other compressor assembly.

Accordingly, the present invention is directed to a filter housing assembly which overcomes one or more of the problems as set forth above.

SUMMARY OF INVENTION

The present invention overcomes many of the shortcomings and limitations of the prior art devices discussed above and teaches the construction and operation of several embodiments of a filter housing assembly adaptable for use in a wide variety of different compressor assemblies wherein air is filtered or otherwise purged of contaminants such as for use in oxygen concentrators and other medical applications in the home care medical equipment area. In one aspect of the present invention, the filter assembly includes a housing structure that is preferably frusto-conical in shape having a domed end portion, the filter housing member being adaptable to receive either a pleated type filter member or a solid core type filter member, with either filter member configuration having a passageway extending therethrough. A single hole is positioned in the domed portion of the filter housing member for allowing ambient air to enter the filter assembly for passage therethrough before being compressed for use in an oxygen concentrator or other compressor application. This single hole is preferably positioned at or near the apex of the housing dome, however, it can be offset from the apex as well. The interior of the filter housing member is substantially hollow and is sized and dimensioned to receive an appropriately sized substantially cylindrical filter member.

A first end cap member is attached and secured to one end portion of the filter member by any suitable means such as by a hot melt adhesive. The opposite end portion of the filter member is likewise attached and secured to a second end cap member by suitable means. The second end cap member includes an opening for allowing air which has circulated through the filter member to exit the filter housing assembly for passage into the oxygen concentrator or other compressor assembly.

The interior of the filter housing member includes a plurality of shoulder members which are strategically positioned towards the domed end portion of the housing member for facilitating the centering of the filter member and its associated end cap members when the filter member is positioned within the housing member. When the filter member is positioned within the filter housing, the first end cap member will engage the plurality of shoulder members preferably via a slip fit type arrangement thereby positioning the filter member in the desired location. Although a slip type fit is generally preferred, other means of engagement are likewise anticipated and recognized.

Ambient air enters the filter assembly through the hole in the domed portion of the housing member. Air then travels through the spaces or gaps which exist between the internally positioned first end cap member and the housing member so as to travel along the entire outer periphery of the filter member. From there, air travels from the outside of the filter member through the filter member to the central passageway extending through the interior portion of the filter member. Once the air has traveled to this interior passageway, it has been filtered and then flows through this interior passageway to the opening extending through the second end cap member for allowing the filtered air to exit the filter assembly for passage into the compressor assembly. Under some operating conditions, it has been found that the hole size associated with both the hole in the domed portion of the housing member as well as the hole in the second end cap member can be controlled to reduce compressor noise. For example, it has been found that under certain operating conditions, hole diameter sizes in the range of 3/16 inch to 1/4 inch is sufficient for noise reduction. Smaller diameter holes can be used, but the additional reduction in noise is not appreciable and the restriction to air flow through the filter member is undesirably increased.

In another aspect of the present invention, the filter housing member includes a plurality of openings in the domed portion thereof for allowing more ambient air to enter and circulate around and through the filter member depending upon the output capacity of the oxygen concentrator or other compressor application involved. In this regard, it is anticipated that any number of holes can be associated with the filter housing member.

BRIEF DESCRIPTION OF DRAWINGS

For a better understanding of the present invention, reference may be made to the accompanying drawings.

FIG. 1 is a perspective view of one embodiment of the present filter housing assembly constructed according to the teachings of the present invention.

FIG. 2 is a perspective view of the filter housing assembly of FIG. 1 showing the single hole positioned in the domed portion of the housing member for allowing air to enter the assembly.

FIG. 3 is a cross sectional view of the filter housing assembly of FIG. 1 showing use of a solid core type filter member.

FIG. 4 is an exploded side elevational view of the filter housing assembly of FIGS. 1–3 showing use of a pleated filter member and its associated filter tube.

FIG. 5 is an end elevational view looking into the interior of the filter housing member of FIGS. 1–4 showing the plurality shoulder members located therewithin as well as the single hole in the domed portion for allowing ambient air to enter the filter assembly.

FIG. 6 is an end elevational view of the domed portion of the filter housing member of FIGS. 1–5.

FIG. 7 is an end elevational view of the domed portion of another embodiment of the present filter housing member showing use of a plurality of openings for allowing ambient air to enter the filter assembly.

DETAILED DESCRIPTION

Referring to the drawings more particularly by reference numbers wherein like numerals refer to like parts, the numeral 1 in FIGS. 1 and 2 identifies a filter housing assembly constructed according to the teachings of the present invention. The filter assembly 1 can be constructed so as to be compatible for attachment to any suitable type of compressor fitting associated with any compressor assembly where the present filter assembly may be utilized. Although the specific compressor application discussed herein is directed to an oxygen concentrator used in the medical equipment industry, it is recognized and anticipated that the present filter housing assembly can be utilized with any compressor assembly where ambient air or any other air source needs to be filtered during the compression process or other application. It is also recognized that the filter housing assembly constructed according to the teachings of the present invention can likewise be fashioned into a variety of different sizes and shapes other than those illustrated herein and that the other components associated with the present assemblies such as the end cap members 12 and 28 may likewise be correspondingly shaped to conform to the shape of the overall assembly without departing from the teachings and practice of the present invention.

The filter housing assembly illustrated in FIGS. 1–4 includes a generally hollow frusto-conical shaped housing member 2 having a dome shaped portion 4 associated with one end portion thereof, a first end cap member 12 for mounting to one end portion of a filter member, and a second end cap member 28 mounted to the opposite end portion of the filter member. The housing member 2 includes a substantially hollow interior accessible from an open end portion 3 as best illustrated in FIG. 4 and is adaptable for receiving a suitably configured filter member as will be hereinafter explained. In the embodiment illustrated in FIGS. 1–6, the domed portion 4 of the filter housing member 2 includes a single hole or opening 6 preferably positioned at or near the apex thereof, and a plurality of circumferentially spaced shoulder members or projections 8 as best illustrated in FIGS. 3–5. The single hole or opening 6 is provided for allowing ambient air to enter the filter housing assembly for passage through the filter member such as the filter member 10 illustrated in FIG. 3, and the shoulder members 8 are provided as a centering mechanism for facilitating the centering of the filter member when such filter member is positioned within the filter housing 2 as will be hereinafter further explained. Although the single hole is illustrated as being located at the apex of domed housing portion 4, it is recognized and anticipated that the hole 6 may be positioned in an offset arrangement from the apex of domed portion 4 depending upon the particular application involved and/or other operational requirements and/or parameters.

As best illustrated in FIGS. 3 and 4, a first end cap member 12 is positioned and attached to one end portion of the filter member itself such as the filter member 10 illustrated in FIG. 3. In this regard, the filter member 10 is substantially cylindrical in shape and is a conventional solid core type filter having a central passageway 20 extending along its entire length as also illustrated in FIG. 3. A conventional substantially cylindrical pleated type filter member 22 is illustrated in FIG. 4 along with a corresponding filter tube member 24 commonly used with pleated type filters. The filter tube 24 typically includes a plurality of openings 26 and is provided as structural support for the pleated filter media. The filter tube member 26 is likewise substantially cylindrical in shape and is dimensioned so as to be insertably received within the central opening such as the opening 20 illustrated in FIG. 3. This central filter opening likewise extends along the full length of a conventional pleated type filter member such as the member 22 illustrated in FIG. 4. Although a filter tube member such as the member 24 may likewise be utilized with a solid core type filter media and such a member 24 is illustrated in FIG. 3, it is recognized that use of a filter tube member may not be necessary when using a solid core type filter member depending upon the structural integrity of the filter member itself.

The first end cap member 12 includes a plurality of upstanding projections or flanges 14 as best illustrated in FIG. 3 which define an outer cylindrical or annular space or cavity 16 which is spaced and dimensioned so as to receive one end portion of the filter member. The filter member such as the members 10 and 22 are bonded or otherwise attached to the first end cap member 12 preferably by a hot melt adhesive which is applied in the cavity or recess area 16 of end cap member 12. One end portion of the filter member is thereafter inserted into the hot melt adhesive creating an air tight bond between the filter media and the end cap member 12. Although a hot melt adhesive is generally preferred, it is also recognized and anticipated that a wide variety of other attachment or bonding means can likewise be utilized to accomplish this task. The inner projections 14 associated with end cap member 12 form a second cavity or recessed area 18 which is shaped and dimensioned to lie in registration with the central opening 20 extending through the filter media such as the filter member 10 illustrated in FIG. 3. Importantly, the first end cap member 12 includes no openings extending therethrough for reasons which will be hereinafter explained relating to controlling the direction of the air flow within the filter housing assembly 1. In the embodiment illustrated in FIGS. 3 and 4, the end cap member 12 is substantially cylindrical and the opposed outer upstanding projections or flanges 14 represent a substantially cylindrical outer perimeter side wall or edge portion while the inner upstanding projections or flanges 14 represent a substantially cylindrical inner side wall defining the cavities or recessed areas 16 and 18.

A second and opposite end cap member 28 is likewise constructed so as to be positioned and attached to the opposite end portion of the filter media such as the filter members 10 and 22 illustrated in FIGS. 3 and 4. Like end cap member 12, end cap member 28 includes a plurality of upstanding projections or flanges 30 and 32, the opposed outer flanges 32 being illustrated as being slightly longer in length as compared to the projections or flanges 30. The upstanding projections or flanges 30 likewise define a substantially cylindrical or annular cavity or recessed area 34 which is sized and dimensioned to receive the opposite end portion of the filter member whereas the outermost flanges 32 in conjunction with the outermost flanges 30 define an area 36 which communicates with the housing member 2 to define an outer peripheral area 40 which completely encircles the filter media when the filter media is inserted within the housing member 2 as will be hereinafter explained. The second end cap member 28 likewise includes a tubular extension 42 as illustrated in FIGS. 3 and 4 having an opening 46 extending therethrough which communicates with an opening 44 formed by and between the innermost projections or flanges 30 associated with end cap member 28. The innermost flanges 30 forming the opening 44 are likewise shaped and dimensioned so as to lie in communication with the central opening extending through the filter media such as the opening 20 extending through filter member 10 illustrated in FIG. 3, the openings 44 and 46 providing an exit passageway for allowing the air which has circulated through the filter member to exit the filter assembly 1 for passage into the compressor assembly.

The tubular extension 42 is illustrated as having internal threads 48 adaptable for threadedly engaging a corresponding compressor fitting to which the present filter assembly 1 would be attached. It is recognized and anticipated that the tubular extension 42 could likewise be modified to adapt for connection to any suitable type of compressor fitting depending upon the particular application involved. This means that the tubular portion 42 of end cap member 28 could be either internally or externally threaded based upon the particular compressor fitting, or a rubber hose or other fitting member could be slideably engaged over the exterior portion of tubular extension 42. Like end cap member 12, end cap member 28 is bonded or otherwise attached to the opposite end portion of the filter media such as filter member 10 preferably by a hot melt adhesive as previously described with respect to end cap member 12, although other attachment or bonding means can likewise be utilized. Regardless of the attachment means utilized, it is important that an air tight seal be created between end cap member 28 and the filter member.

Once end cap members 12 and 28 are attached to the opposite end portions of the filter member such as filter members 10 and 22, this entire assembly is then inserted into filter housing member 2. In this regard, housing member 2 includes a plurality of circumferentially spaced projections or shoulder members 8 (FIGS. 3–5) which are shaped and dimensioned so as to engage the outermost peripheral edge portion or flange 14 associated with the first end cap member 12 as best illustrated in FIG. 3. The shoulder members 8 are strategically positioned within the interior of the housing member 2 towards the domed portion 4 so as to help center the filter member when it is inserted within the housing member 2. When end cap member 12 engages all of the plurality of shoulder members 8, the filter member 10 will be substantially centered within the filter housing 2. This is important so that the annular or cylindrical space 40 will exist all the way around the outer periphery of the filter media and so that air can flow around the entire outer peripheral surface area of the filter member before passing therethrough. If shoulder members 8 are not utilized and the inner surface of the filter housing 2 is substantially smooth, the filter member 10 may not lie substantially centered within the filter housing 2 when inserted therewithin thereby causing an uneven distribution of air flow around the filter media.

Once the filter member is inserted within the filter housing 2, the terminal end portion of the outer peripheral flanges 32 associated with end cap member 28 will engage the terminal edge portion of the filter housing 2 at intersection 50 as best illustrated in FIG. 3. In this regard, the terminal end portion of the flanges 32 associated with end cap member 28 include a recessed or notched surface portion 52 which overlaps and mates with a corresponding recessed or notched surface portion 54 associated with the open end portion 3 of the filter housing 2 as again best illustrated at intersection 50 in FIG. 3. The overlapped and mating surfaces 52 and 54 are thereafter attached or bonded to each other using any suitable means so as to again create an air tight seal between end cap member 28 and filter housing member 2. It has been found that an ultrasonic weld joint accomplishes this task, although other attachment or bonding means can likewise be utilized so long as an air tight seal is formed. In this regard, it is also important to note that the shoulder members 8 should also be positioned and located so as to enable the end cap member 28 to engage the filter housing member 2 such as at joint 50. Once sealed, the filter housing assembly 1 is ready for attachment to any appropriate inlet compressor fitting associated with any compressor assembly including an oxygen concentrator.

Once the present filter housing assembly 1 is installed on an appropriate compressor assembly, air enters the filter housing member 2 through the opening 6 associated with domed portion 4. Since end cap member 12 is solid and includes no openings extending therethrough, air entering the domed housing portion 4 is forced to flow around end cap member 12 and travel between end cap member 12 and the housing member 2 through the spaces or gaps existing between the plurality of spaced shoulder members 8 into the cylindrical or annular space 40 defined by and between the outer peripheral wall portions of the members 2 and 28 and the filter media such as the member 10 (FIG. 3) positioned therewithin. Air then travels along the full length of the annular space 40 along the entire outer periphery of the filter member 10 and then travels from the outside of the filter member 10 through the filter media to the central passageway 20 as best seen in FIG. 3. Since the air that enters the domed portion 4 of the filter housing 2 travels substantially the full length of the annular space 40, the full surface area of the filter media can be utilized for filtration purposes. Once the air has traveled to the interior central passageway 20, it will then flow through passageway 20 to the openings 44 and 46 associated with end cap member 28. Once the air exits passageway 46, it will enter the inlet portion of the compressor assembly to which the filter assembly 1 is attached for processing therethrough.

In certain compressor applications, particularly, where large compressors are being utilized to achieve higher rates of flow, compressor noise may be a problem. It has been found that controlling the diameter of the openings 6, 44 and/or 46 can likewise reduce inlet compressor noise as well as any noise associated with air flowing through the filter housing assembly itself. For example, in one particular application, a ¼ inch diameter hole 6 in the domed portion 4 of the filter housing 2 as well as a ¼ diameter hole 44/46 in end cap member 28 acted as restrictors to air flow which reduced the amount of audible noise generated by the compressor pump. In this particular situation, it was found that larger diameter holes did not sufficiently reduce the amount of noise associated with the compressor. In addition, although smaller diameter holes could likewise be used to further reduce the amount of noise associated with the compressor pump, it was found that this additional noise reduction was not appreciable and, instead, the restriction to air flow through the filter assembly was increased, in some cases, to an undesirable level. As a result, in this particular application, a hole size in the range from about 3/16 inch to about ¼ inch diameter for holes 6, 44 and 46 was found to be sufficient for adequate noise reduction.

It is also recognized and anticipated that in some applications, the diameter of hole 6 can be less than the diameter of holes 44 and/or 46 and, in other applications, the diameter of hole 6 can be greater than the diameter of holes 44 and/or 46. It is also recognized that if the diameter of hole 44 needs to be less than the manufactured diameter as illustrated in FIG. 3, appropriate insert members may be inserted and engaged with the innermost flanges 30 associated with end cap member 28 thereby restricting the manufactured hole size to the desired lesser diameter hole size. It is also recognized and anticipated that the holes 44 and 46 will be fabricated as a single opening extending through end cap member 28 for ease of manufacturing, although different hole sizes for the openings 44 and 46 can be fabricated depending upon the particular compressor application involved.

FIG. 5 is an end elevational view looking into the interior of the housing member 2. Although only four shoulder members 8 are illustrated in this particular embodiment, it is recognized and anticipated that any number of shoulder members 8 can be circumferentially spaced around the interior wall portion of the housing member 2 so long as a sufficient number of members 8 are utilized to substantially center the filter member within the housing member 2 when inserted therewithin. In this regard, it is anticipated that at least three shoulder members 8 will provide adequate centering capability, although a lesser number may be utilized depending upon the actual configuration of the shoulder members 8.

FIG. 7 discloses another embodiment 56 of the present filter housing 2, the housing member 56 being substantially similar in construction and operation to housing member 2 but differing therefrom primarily in the number of holes associated with the domed portion of the housing member. FIG. 7 represents an end elevational view looking at the exterior of domed portion 58 showing the use of a plurality of holes 60 for allowing air to enter the filter housing 56. In this embodiment, it is recognized and anticipated that any number of holes 60 may be distributed across the domed portion 58 of housing member 56, and it is likewise anticipated that the arrangement of the holes 60 may take on a wide variety of different configurations including a configuration different from that illustrated in FIG. 7. The use of a plurality of holes 60 as compared to a single hole 6 allows more airflow to circulate through the filter assembly based upon the specific application needs. Here again, the size of the openings 44, 46 and 60 can be controlled and varied in similar fashion as discussed above with respect to filter housing member 2 both for noise reduction purposes and for other application needs. In all other respects, the construction and operation of housing member 56 is substantially the same as housing member 2 and housing member 56 mates with end cap members 12 and 28 in a similar fashion as discussed above with respect to housing member 2.

Because the tubular portion 42 of end cap member 28 is adapted for easy coupling to a corresponding compressor inlet fitting, such as through the use of the threaded members 48, installation and removal of the entire assembly 1 is relatively quick and easy. Routine maintenance and changing of the entire filter assembly 1 is easily accomplished by merely unscrewing or otherwise uncoupling tubular extension 42 from a compressor inlet fitting and thereafter reinstalling a new filter assembly 1.

It is also anticipated that the filter housing members 2 and 56 as well as end cap members 12 and 28 will be made using an injection molded plastic resin, although other materials may likewise be utilized. Still further, it is also recognized that the overall dimensions of the present filter housing assembly as well as the specific shape and configuration of the various members associated therewith such as the members 2, 12, 28 and 56 are all subject to wide variations and may be sized and shaped into a variety of different sizes and configurations so as to be compatible with the size and shape of the particular compressor assembly into which the present structures may be mounted, or to conform with any space limitations associated therewith without impairing the teachings and practice of the present invention. Although the filter housing members 2 and 56 are preferable frusto-conical in shape, such members can likewise be substantially cylindrical in shape compatible with the conventional cylindrical filter media presently utilized in the known filter assemblies. Other variations and modifications to the various components comprising the present structures are also contemplated.

Thus there has been shown and described several embodiments of a novel filter housing assembly which is adaptable for installation onto the inlet of any compressor assembly, which filter housing assemblies fulfill all of the objects and advantages sought therefore. Many changes, modifications, variations and other uses and applications of the present invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A filter housing assembly for housing a filter member therewithin comprising:
   a one-piece substantially frusto-conical shaped housing member having an open end portion and a substantially closed dome shaped portion, said housing member having a substantially hollow interior accessible from said open end portion and adaptable for receiving a substantial portion of a filter member when positioned therewithin, said substantially closed dome shaped portion having at least one opening extending therethrough for allowing air to enter said housing member, said at least one opening being contained within the outer periphery of said substantially closed dome shaped portion;
   a first end cap member adaptable for engaging one end portion of a filter member and being receivable within the interior of said housing member; and
   a second end cap member adaptable for engaging the opposite end portion of a filter member and being engageable with the opened end portion of said housing member, said second end cap member having an opening associated therewith for allowing air to exit said housing member.

2. The filter housing assembly as defined in claim 1 wherein said first and second end cap members and said housing member form a peripheral space around a filter element when said first end cap member and a filter member are positioned within said housing member and when said second end cap member is engaged with the open end portion of said housing member.

3. The filter housing assembly as defined in claim 1 wherein said at least one opening extending through the closed dome shaped portion of said housing member is located near the apex thereof.

4. The filter housing assembly as defined in claim 1 wherein said at least one opening extending through the closed dome shaped portion of said housing member is offset from the apex thereof.

5. The filter housing assembly as defined in claim 1 wherein the size of said at least one opening extending through the closed dome shaped portion of said housing member is substantially equal to the size of the opening associated with said second end cap member.

6. The filter housing assembly as defined in claim 1 wherein the size of said at least one opening extending through the closed dome shaped portion of said housing member is less than the size of the opening associated with said second end cap member.

7. The filter housing assembly as defined in claim 1 wherein the size of said at least one opening extending through the closed dome shaped portion of said housing member is greater than the size of the opening associated with said second end cap member.

8. The filter housing assembly as defined in claim 1 wherein said housing member includes a plurality of circumferentially spaced projections associated with the interior thereof, said spaced projections being positioned and located to facilitate centering of a filter member within said housing member when a filter member is positioned therewithin.

9. The filter housing assembly as defined in claim 8 wherein said first end cap member engages said plurality of spaced projections when positioned within said housing member.

10. The filter housing assembly as defined in claim 1 wherein the closed dome shaped portion of said housing member includes a plurality of openings extending therethrough for allowing air to enter said housing member, each of said plurality of openings being contained within the outer periphery of said domed shaped portion.

11. A filter housing assembly for housing a filter member therewithin for use in an oxygen concentrator comprising:
    a substantially frusto-conical shaped housing member having an open end portion associated with one end portion thereof and a dome shaped portion associated with the opposite end portion thereof, said housing member having a substantially hollow interior accessible from said open end portion and adaptable for receiving a substantial portion of a filter member when positioned therewithin, a single opening extending through the dome shaped portion of said housing member and contained within the outer periphery of said dome shaped portion for allowing air to enter said housing member, and a plurality of circumferentially spaced shoulder members associated with the interior of said housing member;
    a first end cap member adaptable for engaging one end portion of a filter member and being insertable within the interior of said housing member, said first end cap member being engageable with said plurality of shoulder members when inserted within said housing member; and
    a second end cap member adaptable for engaging the opposite end portion of a filter member, said second end cap member being engageable with said housing member and having an opening associated therewith for allowing air to exit said housing member, said first and second end cap members and said housing member forming a peripheral space around a filter member when said first end cap member and a filter member are positioned within said housing member and said first end cap member engages said plurality of shoulder members and when said second end cap member is engaged with said housing member.

12. The filter housing assembly as defined in claim 11 wherein said single opening in the dome shaped portion of said housing member is located near the apex thereof.

13. The filter housing assembly as defined in claim 11 wherein a filter member includes a passageway extending therethrough, the opening associated with said second end cap member being positioned and located so as to lie in communication with the passageway extending through the filter member when said second end cap member is engaged with the opposite end portion of the filter member.

14. The filter housing assembly as defined in claim 12 wherein the single opening extending through the dome shaped portion of said housing member is substantially equal to the opening associated with said second end cap member.

15. The filter housing assembly as defined in claim 12 wherein the single opening extending through the dome shaped portion of said housing member is less than the opening associated with said second end cap member.

16. The filter housing assembly as defined in claim 12 wherein the single opening extending through the dome shaped portion of said housing member is greater than the opening associated with said second end cap member.

17. The filter housing assembly as defined in claim 11 wherein the size of the single opening extending through the dome shaped portion of said housing member and the size of the opening associated with said second end cap member fall in the range from about 3/16 inch to about 1/4 inch diameter.

18. A filter housing assembly for housing a filter member therewithin for use in an oxygen concentrator comprising:

a substantially frusto-conical shaped housing member having an open end portion associated with one end portion thereof and a dome shaped portion associated with the opposite end portion thereof, said housing member having a substantially hollow interior accessible from said open end portion and adaptable for receiving a substantial portion of a filter member when positioned therewithin, a plurality of openings extending through the dome shaped portion of said housing member and located within the outer periphery of said dome shaped portion for allowing air to enter said housing member, and a plurality of circumferentially spaced shoulder members associated with the inside periphery of said housing member;

a first end cap member adaptable for engaging one end portion of a filter member and being insertable within the interior of said housing member, said first end cap member being engageable with said plurality of shoulder members when inserted within said housing member; and a second end cap member adaptable for engaging the opposite end portion of a filter member, said second end cap member being engageable with said housing member and having an opening associated therewith for allowing air to exit said housing member, said first and second end cap members and said housing member forming a peripheral space around a filter member when said first end cap member and a filter member are positioned within said housing member and said first end cap member engages said plurality of shoulder members and when said second end cap member is engaged with said housing member, said first end cap member and said plurality of shoulder members forming additional spaces by and between said first end cap member, said plurality of shoulder members and said housing member when said first end cap member is engaged with said plurality of shoulder members so as to allow air entering the dome shaped portion of said housing member to travel to the peripheral space formed around a filter member positioned within said housing member.

19. A filter assembly for housing a filter member therewithin comprising:

a one-piece substantially frusto-conical shaped housing member having an open end portion and a substantially closed dome shaped portion adaptable for receiving a filter member therewithin, said housing member having a substantially hollow interior accessible from said open end portion, and at least one opening extending through the closed dome shaped portion of said housing member for allowing air to enter said housing member, said at least one opening being located so as not to extend beyond the outer periphery of said dome shaped portion;

a filter member adaptable for being housed within the interior of said housing member;

a first end cap member insertable within the interior of said housing member, said first end cap member being attachable to one end portion of said filter member;

a second end cap member attachable to the opposite end portion of said filter member and to the open end portion of said housing member, said second end cap member having an opening associated therewith for allowing air to exit said housing member; and a plurality of shoulder members associated with the inside periphery of said housing member, said shoulder members being positioned and located to facilitate centering of said filter member within said housing member when said filter member is positioned therewithin;

said filter member when engaged with said first and second end cap members being insertable into said housing member such that said first end cap member engages said plurality of shoulder members, said first and second end cap members and said housing member forming a peripheral space around said filter member, engagement of said first end cap member with said plurality of shoulder members forming additional spaces by and between said first end cap member, said plurality of shoulder members and said housing member for enabling air entering said at least one opening in the substantially closed dome shaped portion of said housing member to travel through said peripheral space to said filter member.

20. The filter assembly as defined in claim 19 wherein the substantially closed dome shaped portion of said housing member includes a plurality of openings extending therethrough, each of said plurality of openings being located so as not to extend beyond the outer periphery of said dome shaped portion.

21. The filter assembly as defined in claim 19 wherein said at least one opening extending through the substantially closed dome shaped portion of said housing member is positioned and located near the apex thereof.

22. A method for assembling a filtration unit for use on a compressor assembly comprising the following steps:

(a) selecting a filter member;

(b) sealingly attaching one end portion of said filter element to a first end cap member;

(c) sealingly attaching the opposite end portion of said filter member to a second end cap member, said second end cap member having an opening associated therewith;

(d) inserting said filter member attached to said first and second end cap members within a one-piece filter housing member, said filter housing member being substantially frusto-conical in shape and having a substantially hollow interior adaptable for receiving a substantial portion of the filter member, said housing member having an open end portion for allowing access to the interior thereof and having a substantially closed dome shaped portion, at least one opening extending through said dome shaped portion for allowing air to enter said housing member, said at least one opening being located so as not to extend beyond the outer periphery of said dome shaped portion, said housing member further including a plurality of circumferentially spaced projections associated with the interior thereof;

positioning said filter member attached to said first and second end cap members within said housing member such that said first end cap member engages said plurality of spaced shoulder members and said second end cap member engages said housing member; and sealingly attaching said second end cap member to said housing member.

23. The method as defined in claim 22 wherein the one end portion of said filter member is attached to said first end cap member by applying a hot melt adhesive to at least a portion of said first end cap member, and wherein the one end portion of said filter member is thereafter engaged with the hot melt adhesive so as to create an air tight bond therebetween.

24. The method as defined in claim 22 wherein the opposite end portion of said filter member is attached to said second end cap member by applying a hot melt adhesive to at least a portion of said second end cap member, and wherein the opposite end portion of said filter member is thereafter engaged with the hot melt adhesive so as to create an air tight bond therebetween.

25. The method as defined in claim 22 wherein said second end cap member is attached to said housing member through the use of an ultrasonic weld so as to create an air tight bond therebetween.

26. The method as defined in claim 22 wherein said second end cap member includes a tubular portion, the opening associated with said second end cap member extending through said tubular portion, said tubular portion being engageable with a compressor assembly.

* * * * *

UNITED STATES PATENT AND TRADEMARK OFFICE
CERTIFICATE OF CORRECTION

| | | |
|---|---|---|
| PATENT NO. | : 6,866,700 B2 | Page 1 of 1 |
| APPLICATION NO. | : 10/064898 | |
| DATED | : March 15, 2005 | |
| INVENTOR(S) | : Harold P. Amann | |

It is certified that error appears in the above-identified patent and that said Letters Patent is hereby corrected as shown below:

Title Page
In item (73), on page 1 of the patent, delete "AG Industries, Fenton, MO" and replace with -- Home Health Medical Equipment Incorporated d/b/a AG Industries, Fenton, MO--

Signed and Sealed this

First Day of August, 2006

JON W. DUDAS
*Director of the United States Patent and Trademark Office*